United States Patent [19]

Norris

[11] Patent Number: 5,095,462

[45] Date of Patent: Mar. 10, 1992

[54] FIFO INFORMATION STORAGE APPARATUS INCLUDING STATUS AND LOGIC MODULES FOR EACH CELL

[75] Inventor: David Norris, Austin, Tex.

[73] Assignee: Advanced Micro Devices, Inc., Sunnyvale, Calif.

[21] Appl. No.: 528,864

[22] Filed: May 25, 1990

[51] Int. Cl.$^5$ .................. G11C 19/00; G11C 7/00
[52] U.S. Cl. .......................... 365/221; 365/189.08
[58] Field of Search ............ 365/221, 189.08, 78, 365/233, 73, 189.12

[56] References Cited

U.S. PATENT DOCUMENTS

| | | | |
|---|---|---|---|
| 4,151,609 | 4/1979 | Moss | 365/221 |
| 4,156,288 | 5/1979 | Spandorfer | 365/78 |
| 4,163,291 | 7/1979 | Suzuki et al. | 365/78 |
| 4,222,102 | 9/1980 | Jansen et al. | 365/221 |
| 4,296,477 | 10/1981 | Hutson | 365/78 |
| 4,592,019 | 5/1986 | Huang et al. | 365/78 |
| 4,833,655 | 5/1989 | Wolf et al. | 365/221 |

Primary Examiner—Glenn Gossage
Attorney, Agent, or Firm—Foley & Lardner

[57] ABSTRACT

An information storage apparatus for first-in-first-out storage and output of information includes a plurality of storage cells, an input circuit for inputting information to the storage cells, and a control circuit for controlling the operation of the apparatus in response to at least one clock signal. The storage cells are arranged to effect serial progression of information therethrough in a predetermined sequence to an output, all in response to the control circuit. The control circuit directs the information through the input circuit to the empty cell of the plurality of storage cells which is most proximate to the output of the apparatus. The input circuit provides the information to a set of first storage cells and provides an inverse representation of the information to a set of second storage cells, the first storage cells preferably being odd-numbered storage cells from the output and the second storage cells preferably being even-numbered storage cells from the output.

10 Claims, 5 Drawing Sheets

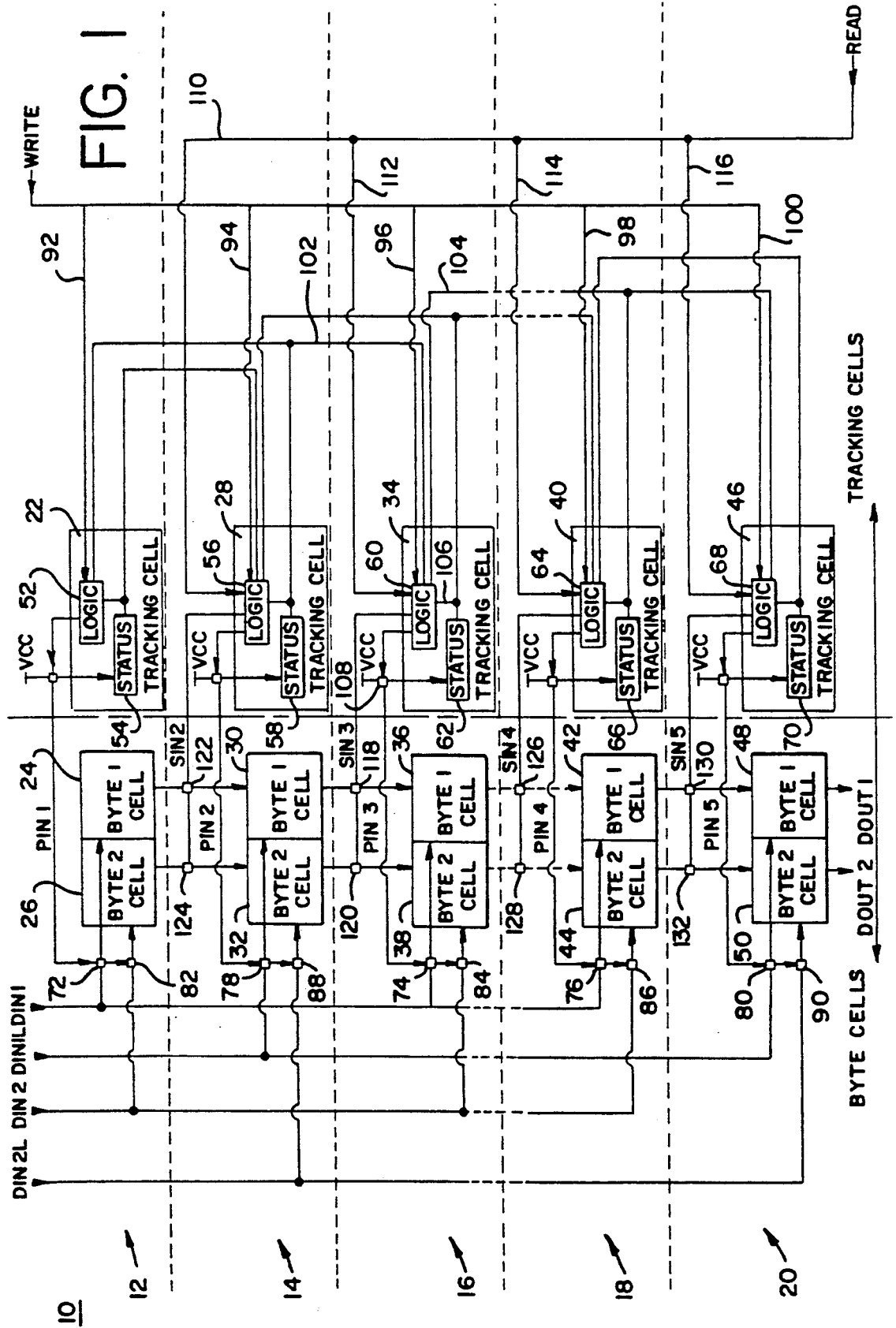

FIFO INFORMATION STORAGE APPARATUS INCLUDING STATUS AND LOGIC MODULES FOR EACH CELL

BACKGROUND OF THE INVENTION

The present invention is directed to an information storage apparatus adaptable for first-in-first-out storage and output of information packets. In particular, the present invention is an information storage apparatus which is particularly amenable to implementation in large sizes without adding to propagation delay.

Prior art storage devices effecting a first-in-first-out (FIFO) mode of operation, such as the device disclosed in U.S. Letters Pat. No. 4,805,139, "Propagating FIFO Storage Device", issued to the same inventor and assigned to the same assignee as the present application, provide for input of information packets at a first cell in a plurality of cells making up the FIFO storage device. Clock signals control the propagation of information through the plurality of cells making up the FIFO storage device until the information packets reach the output of the device. Thus, by adding a greater capacity to the prior art devices, in the form of a greater number of storage cells, the propagation delay in passing information packets through the storage device is increased.

The FIFO operation of the present invention results in a queueing of information packets in successive storage cells from the output o the apparatus while awaiting a clock signal to transmit an information packet from the output. It is useful to regard such a queue of information packets as a "stack" of information packets, with the bottom of the stack adjacent the output of the apparatus and the top of the stack being the information packet most distal from the output.

The present invention overcomes the disadvantage of increased propagation time with increased size of the storage device. The present invention employs a control circuit, which detects the top of the stack of information packets within the storage cells, and an input means, which directs newly arriving information packet directly to the next available empty storage cell nearest the output of the device (i.e., to the top of the stack). Thus, the previously inherent trade-off of increased propagation time for increased storage capacity is eliminated.

SUMMARY OF THE INVENTION

The invention is an information storage apparatus adaptable for first-in-first-out storage and output of information packets.

Specifically, the invention comprises an array of storage cells for storing information packets, an input circuit for inputting information packets, and a control circuit for controlling movement of information packets within the apparatus. Each respective storage cell of the array of storage cells includes at least one byte cell; the array of storage cells includes a plurality of first storage cells and a plurality of second storage cells. One of the plurality of first storage cells and the plurality of second storage cells are operatively connected as odd-numbered storage cells from the output, and the other of the plurality of first storage cells and the plurality of second storage cells are operatively connected as even-numbered storage cells from the output. The control circuit includes a status circuit for registering a status for each respective storage cell of the array of storage cells. The control circuit further includes a plurality of logic circuits for monitoring the status of adjacent storage cells of the array of storage cells; the input circuit inputs the information packets to the plurality of second storage cells and inputs an inverse representation of the information packets to the plurality of first storage cells.

The control circuit, for each respective storage cell of the plurality of storage cells, determines that the respective storage cell is empty and determines that the next preceding storage cell is not empty as prerequisite conditions to enabling serial progression of the information packet from the next preceding storage cell to the respective storage cell. Further, the control circuit, for each respective storage cell determines that the respective storage cell is empty, determines that the next preceding storage cell is empty, and determines that the next succeeding storage cell is not empty, thereby determining the top of the stack of information within the plurality of storage cells and, consequently, enabling delivery of a respective information packet to the respective storage cell.

It is, therefore, an object of the present invention to provide an information storage apparatus which is adaptable for first-in-first-out storage and output of information packets.

A further object of the present invention is to provide an information storage apparatus which effects data input directly to the empty storage cell most proximate to the output of the storage apparatus.

Yet a further object of the present invention is to provide an information storage apparatus which can be increased in capacity in terms of numbers of storage cells, with no adverse impact in terms of increased propagation time of information through the storage apparatus.

Further objects and features of the present invention will be apparent from the following specification and claims when considered in connection with the accompanying drawings illustrating the preferred embodiment of the invention.

DETAILED DESCRIPTION OF THE DRAWINGS

FIG. 1 is a schematic block diagram of an information storage apparatus according to the preferred embodiment of the present invention.

DETAILED DESCRIPTION OF THE INVENTION

Figure 2A:
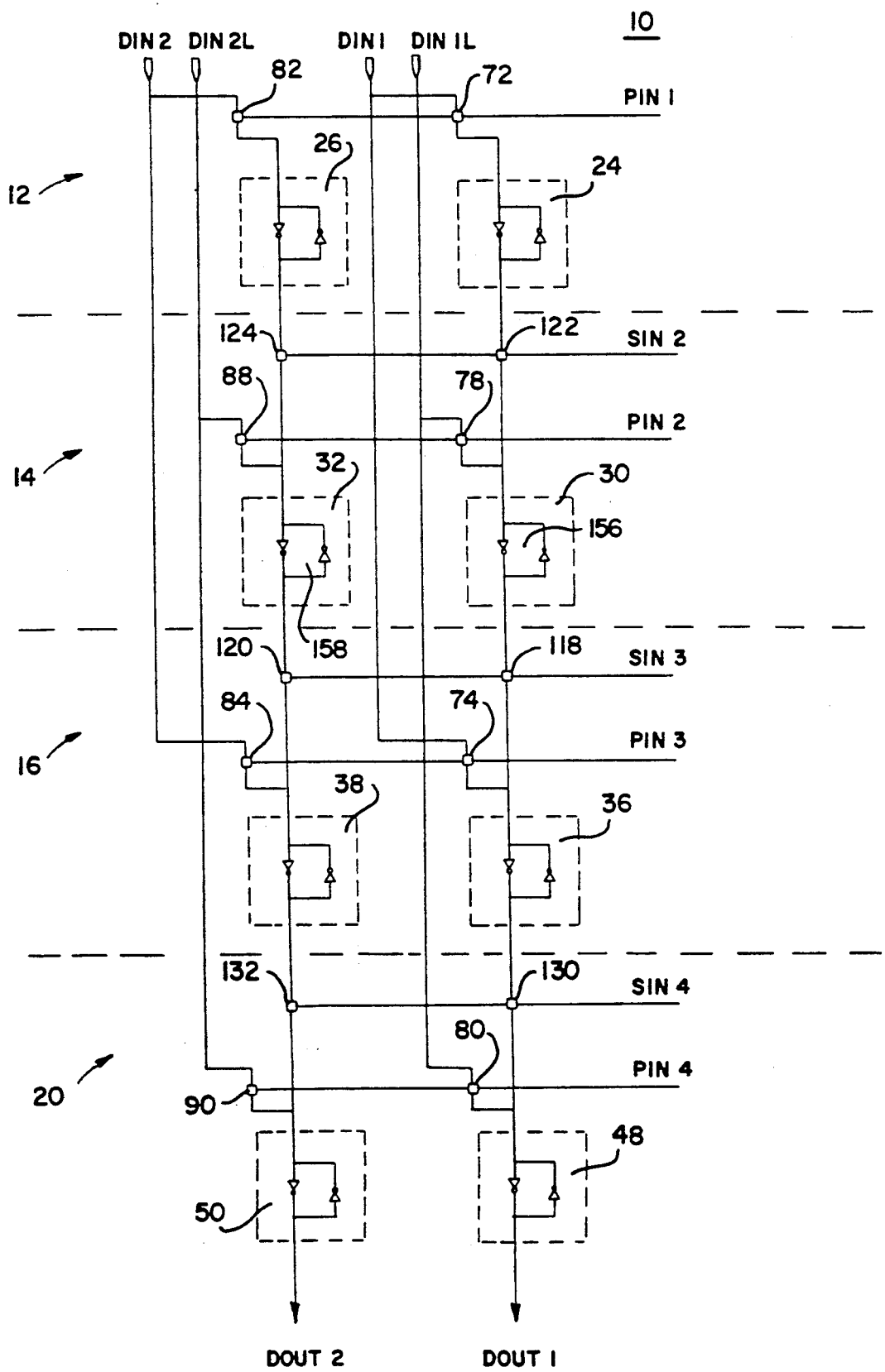
FIG. 2A and FIG. 2B represent an electrical schematic diagram of an information storage apparatus according to the preferred embodiment of the present invention.

In FIG. 1, an information storage apparatus 10 is illustrated in a schematic block diagram. Apparatus 10 is comprised of a plurality of storage cells 12, 14, 16, 18, 20. As indicated by dotted lines intermediate storage cell 16 and storage cell 18, additional storage cells may be interposed to provide an apparatus 10 of any number of storage cells.

Each storage cell 12, 14, 16, 18, 20 is comprised of a plurality of byte cells and an associated tracking cell.

The number of byte cells associated with a storage cell 12, 14, 16, 18, 20 may vary according to the length of an information packet which may be desired to be stored within apparatus 10.

For purposes of illustration, FIG. 1 illustrates an apparatus 10 having two byte cells per storage cell 12, 14, 16, 18, 20.

Accordingly, storage cell 12 is comprised of tracking cell 22 and byte cells 24, 26; storage cell 16 is comprised of tracking cell 28 and byte cells 30, 32; storage cell 16 is comprised of tracking cell 34 and byte cells 36, 38; storage cell 18 is comprised of tracking cell 40 and byte cells 42, 44; and storage cell 20 is comprised of tracking cell 46 and byte cells 48, 50.

Each tracking cell 22, 28, 34, 40, 46 is comprised of a logic module and a status module. Accordingly, tracking cell 22 includes logic module 52 and status module 54; tracking cell 28 includes logic module 56 and status module 58; tracking cell 34 includes logic module 60 and status module 62; tracking cell 40 includes logic module 64 and status module 66; and tracking cell 46 includes logic module 68 and status module 70.

Input to respective storage cells 12, 14, 16, 18, 20 is effected through parallel input lines for each bit of information to respective byte cells 24, 26, 30, 32, 36, 38, 42, 44, 48, 50. Accordingly, byte 1 of information is provided by noninverted data input line DIN1 and by inverted data input line DIN1L. Preferably, inverted inputs provided by data input line DIN1L are applied to storage cells oddly numbered from the output of the apparatus 10 at data output lines DOUT1, DOUT2, and noninverted inputs are provided by data input line DIN1 to evenly numbered storage cells from the output of apparatus 10.

Thus, in FIG. 1, inverted inputs are applied by inverted data input line DINIL to storage cells 20 and 14, and noninverted inputs are provided to storage cells 18, 16, and 12 by data input line DIN1. Similarly, inverted data input DIN2L is applied to byte cell 50 of storage cell 20 and to byte cell 32 of storage cell 14; noninverted data input DIN2 is applied to byte cell 44 of storage cell 18, byte cell 38 of storage cell 16, and byte cell 26 of storage cell 12. Input to the various storage cells 12, 14, 16, 18, 20 is controlled by gates. Thus, noninverted data input line DIN1 is controlled by gates 72, 74, and 76; inverted data input line DIN1L is controlled by gates 78 and 80; noninverted data input line DIN2 is controlled by gates 82, 84, and 86; and inverted data input line DIN2L is controlled by gates 88 and 90.

A WRITE signal is applied to logic module 52, 56, 60, 64, and 68 by WRITE lines 92, 94, 96, 98, and 100. Logic modules 52, 56, 60, 64, 68 all operate similarly and, thus, logic module 60 will be described as representative of the operation of all logic modules 52, 56, 60, 64, 68.

Logic module 60 receives a WRITE signal from WRITE line 96. Logic module 60 also receives an indication of the status of storage cell 14 from status module 58 via line 102, receives status information as to the status of storage cell 18 from status module 66 via line 104, and receives status information regarding the status of storage cell 16 from status module 62 via line 106. When logic module 60 determines that storage cell 16 is empty, that storage cell 14 is empty, and that storage cell 18 contains information, then logic module 60 allows the WRITE signal to pass to parallel input line PIN3, thereby gating gate 74 and allowing data input DIN1 to pass information to byte cell 36. PIN3 also gates gate 84, thereby allowing data input line DIN2 to enter information in byte cell 38. Additionally, a gate 108 is gated allowing VCC to be applied to status module 62, thereby indicating that storage cell 16 is now full. In such manner, logic module 60 checks for the "top of the stack" of information packets within apparatus 10.

In a similar manner, logic module 64 will check status module 62, status module 66, and status module 70 to ascertain whether storage cell 18 is the "top of the stack" of information packets within apparatus 10. Similarly, logic module 56 will check status module 54, status module 58, and status module 62 in determining whether storage cell 14 is the "top of the stack" of information packets within apparatus 10. Logic module 52, being associated with the topmost storage cell 12, needs only to check with status modules 54, 58 in determining whether storage cell 12 is the "top of the stack"; similarly, logic module 68 needs only to check status modules 70 and 66 to determine whether storage cell 20 is the "top of the stack" of information packets within apparatus 10.

That is, when logic module 68 determines that storage cell 18 is empty (by checking status module 66) and that storage cell 20 is empty (by checking status module 70), then it is determined that storage cell 20 is the "top of the stack"; i.e., no data is stored "below" storage cell 20 (since there are no storage cells "below") and no data is waiting to be written to storage cell 20 from storage cell 18.

Each respective tracking cell 22, 28, 34, 40, 46, by its respective logic module 52, 56, 60, 64, 68 checking for "top of stack" location and controlling consequent gating of data input lines DIN1, DIN1L, DIN2, DIN2L (and any additional parallel inputs for additional bytes of information in an information packet—not shown in FIG. 1) data may be input directly to the "top of the stack", i.e., directly to the empty storage cell most proximate the output of apparatus 10.

A READ signal is applied to logic module 56 by READ line 110, to logic module 60 by READ line 112, to logic module 64 by READ line 114, and to logic module 68 by READ line 116. In controlling the READ function for propagating information packets from storage cell to storage cell within the apparatus 10, logic module 60 will check status module 58, via line 102, and will check status module 62, via line 106, to ascertain that storage cell 16 is empty and storage cell 14 contains information. When those two conditions are met, a READ signal is allowed to pass to serial input line SIN3. The READ signal on serial input line SIN3 gates a gate 118 to propagate information from byte cell 30 to byte cell 36, and gates a gate 120 to effect propagation of information from byte cell 32 to byte cell 38.

Similarly, logic module 56 receives a READ signal from READ line 110 and, if status module 54 indicates that storage cell 12 is full and status module 58 indicates that storage cell 14 is empty, then logic module 56 allows the READ signal to pass to serial input line SIN2 which, in turn, gates gate 122 to enable propagation of information from byte cell 24 to byte cell 30, and gates gate 124 to enable propagation of information from byte cell 26 to byte cell 32. Likewise, logic module 64 receives the READ signal from READ line 114 and, if status module 62 indicates that storage cell 16 is full and status module 66 indicates that storage cell 18 is empty, then logic module 64 allows the READ signal to pass to serial input line SIN4. The READ signal then gates gate 126 to enable propagation of information from byte cell 36 to byte cell 42 and gates gate 128 to enable propagation of information from byte cell 38 to byte cell 44. Logic module 68 receives a READ signal from READ line 116 and, if status module 66 indicates that storage cell 18 is full and status module 70 indicates that storage cell 20 is empty, then logic module 68 gates the READ signal to serial input line SIN5 which enables gating of gate 130 to effect propagation of information from byte cell 42 to byte cell 48 and gates gate 132 to enable propagation of information from byte cell 44 to byte cell 50.

Thus, during a READ operation, each respective logic module checks to ensure availability of its respective storage cell to receive information and checks that the next higher storage cell contains information, thus determining whether the prerequisite conditions are satisfactory for enabling propagation of information, byte-by-byte, from an upper storage cell to a lower storage cell.

For purposes of ease of understanding of the invention, like elements will be identified by like reference numerals in the various figures.

Figure 2B:
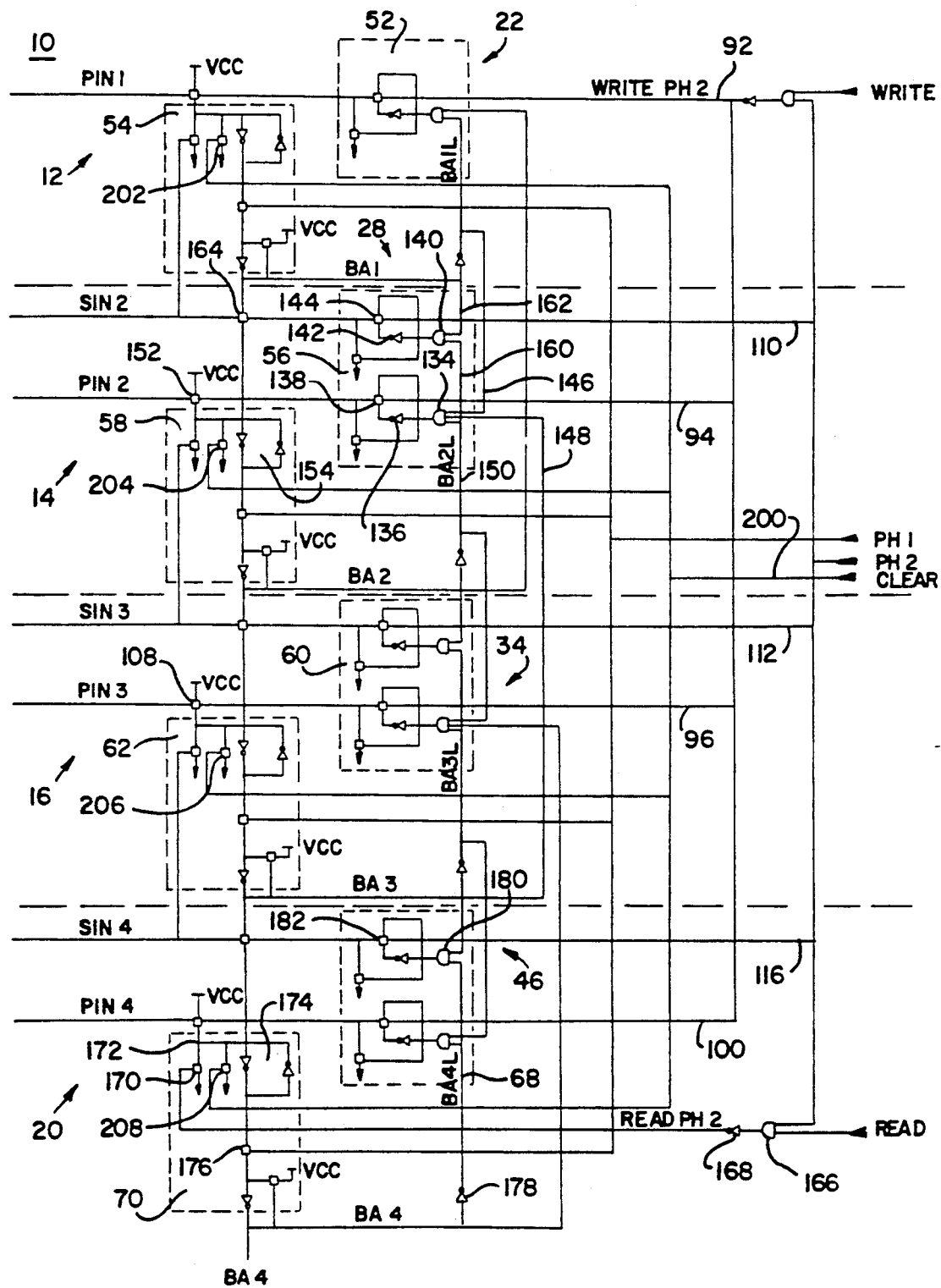

FIGS. 2A and 2B represent an electrical schematic diagram of the preferred embodiment of the present invention. In FIGS. 2A and 2B, a representative apparatus 10 is illustrated having storage cells 12, 14, 16, and 20. Each storage cell 12, 14, 16, 20 is comprised of a plurality of byte cells and an associated tracking cell. For purposes of illustration, two byte cells are shown for each storage cell 12, 14, 16, 20, but, as will be recognized by one skilled in the art, additional byte cells may be employed to accommodate larger information packets. Thus, storage cell 12 has byte cells 24 and 26 and associated tracking cell 22 which includes logic module 52 and status module 54. Storage cell 14 has byte cells 30, 32 and associated tracking cell 28 which includes logic module 56 and status module 58. Storage cell 16 has byte cells 36, 38 and an associated tracking cell 34 which includes logic module 60 and status module 62. Storage cell 20 has byte cells 48, 50 and an associated tracking cell 46 which includes logic module 68 and status module 70.

Storage cell 12 is the first storage cell in the stack of apparatus 10 and, therefore, has a slightly different logic module 52 than do middle storage cells 14, 16. Similarly, storage cell 20, being the last storage cell in the stack of apparatus 10, has a different logic module 46 than the other storage cells 12, 14, 16. Referring to middle storage cells 14, 16, and initially by way of illustration specifically referring to storage cell 14, logic module 56 is seen to comprise a parallel input logic circuit including NAND gate 134, inverter 136, and gate 138. Similarly, associated with serial input line SIN2 is a NAND gate 140, an inverter 142 and a transmission gate 144. NAND gate 134 receives an input 146 which is operatively connected to status module 54, an input 148 which is operatively connected to status module 62, and an input 150 which is operatively connected to status module 58. If each of the inputs 146, 148, 150 is a logic level "1", thereby indicating that storage cell 12 is empty, that storage cell 14 is empty, and that storage cell 16 is not empty, then the output of NAND gate 134 goes low, is inverted by inverter 136, and effects gating of transmission gate 138 to allow parallel input signal PIN2 to pass through transmission gate 138. Parallel input signal PIN2 thus gates transmission gate 78 to enable inverted data input line DIN1L to enter information to byte cell 30, and gates transmission gate 88 to allow inverted data input DIN2L to enter information to byte cell 32. Additionally, transmission gate 152 is gated by parallel input signal PIN2 to apply VCC to status module 58 in order that status module 58 may accurately indicate that an information packet is stored in storage cell 14.

Status module 58 includes a paired inverter storage cell 154 and, similarly, byte cell 30 is comprised of a paired inverter storage cell 156 and byte cell 32 is comprised of a paired inverter storage cell 158.

Byte cells 24, 26, 30, 32, 36, 38, 48, 50 are configured in the preferred embodiment of the present invention illustrated in FIG. 2A as paired inverter storage cells (viz., paired inverter storage cells 156, 158).

Referring to byte cells 30, 32 for purposes of illustration, because of paired inverter storage cell 156, byte cell 30 will have an output, gated by gate 118, which is the inverse of the input to byte cell 30, gated by gate 78. Similarly, because of paired inverter storage cell 158, byte cell 32 will have an output, gated by gate 120, which is the inverse of the input to byte cell 32, gated by gate 88.

Prior art devices employing paired inverter storage cells such as paired inverter storage cells 156, 158 employ an additional inverter in the output of each such storage cell in order that the output of a respective such storage cell will be of the same polarity as its input. The present invention, by providing inverse representations of inputs to alternating storage cells allows elimination of inverters from the output of each respective storage cell. As a result, manufacture of the information storage apparatus of the present invention is simpler, cheaper, and occupies less board space (commonly know as "real estate" in the trade) than prior art devices. Such reduced real estate occupancy is especially advantageous because it facilitates miniaturization of the information storage apparatus of the present invention, a desired attribute in industry.

Thus, for odd-numbered storage cells from the output (i.e., storage cells 20, 14 in FIG. 2A) an inverse representation of information to be sorted is presented on data input lines DIN1L, DIN2L. Information received by such odd-numbered storage cells will experience an odd number of inversions as it progresses through apparatus 10, thereby ensuring that outputs of such information, when appearing at data output lines DOUT1, DOUT2 will have an appropriate polarity to accurately represent the information. True representations of information to be stored are inputted to even-numbered storage cells from the output (i.e., storage cells 16, 12 in FIG. 2A) by data input lines DIN1, DIN2. Inputs provided by data input lines DIN1, DIN2 will undergo an even number of inversions as the information progresses through apparatus 10, resulting in the presentation of information at data output lines DOUT1, DOUT2 which truly represents the information.

In such manner, tracking cell 28, with its included logic module 56 and status module 58, detects the "top of the stack" of information within apparatus 10 and enables bytes of an information packet to go directly to the empty storage cell most proximate the output DOUT1, DOUT2 of apparatus 10, i.e., directly to the "top of the stack" of information stored within apparatus 10.

Serial input signal SIN2 is controlled by logic module 56, and in particular, by NAND gate 140 and its associated inverter 142 and transmission gate 144. NAND gate 140 receives an input 160 which is operatively connected to status module 58, and receives an input 162 which is operatively connected to status module 54. When both inputs 160, 162 are logic "1", thereby indicating that storage cell 12 contains information and storage cell 14 is empty, the output of NAND gate 140 goes low, is inverted by inverter 142, and gates transmission gate 144 to allow passage of serial input signal SIN2 to effect gating of gate 122 to enable propagation of information from byte cell 24 to byte cell 30, and also to gate transmission gate 124 to enable propagation of information from byte cell 26 to byte cell 32. Serial input signal SIN2 also effects gating of transmission gate 164 in order to pass the "full" status indicated by status module 54 to status module 58 and accurately indicate that an information packet has been passed from storage cell 12 to storage cell 14.

A CLEAR signal is employable to configure apparatus 10 as though all storage cells 12, 14, 16, 20 were empty. Thus, a CLEAR signal may be applied via line 200 simultaneously to gates 202, 204, 206, 208. Gates 202, 204, 206, 208 respectively gate status modules 54, 58, 62, 70 to ground. By such grounding, status modules 54, 58, 62, 70 are forced to indicate that their respective storage cells 12, 14, 16, 20 are empty, even though information which may have been stored in storage cells 12, 14, 16, 20 remains stored therein. Apparatus 10 is thus configured to react to READ and WRITE signals as though apparatus 10 were empty. New information inputted into apparatus 10 will be first stored in storage cell 20 and subsequently will be stored in storage cells 16, 14, 12, respectively. A READ signal will evince no reaction because all storage cells appear to be empty.

In order to ensure clarity of understanding of FIGS. 2A and 2B, detailed identification of elements will not attempted. Given the detailed description of the preferred embodiment of the invention in connection with FIG. 1, and the correlation of box identifications between FIG. 1 and FIGS. 2A and 2B, along with the detailed description of operation of storage cell 14, one skilled in the art may readily understand the operation of the preferred embodiment of the present invention illustrated in FIGS. 2A and 2B.

Figure 3:
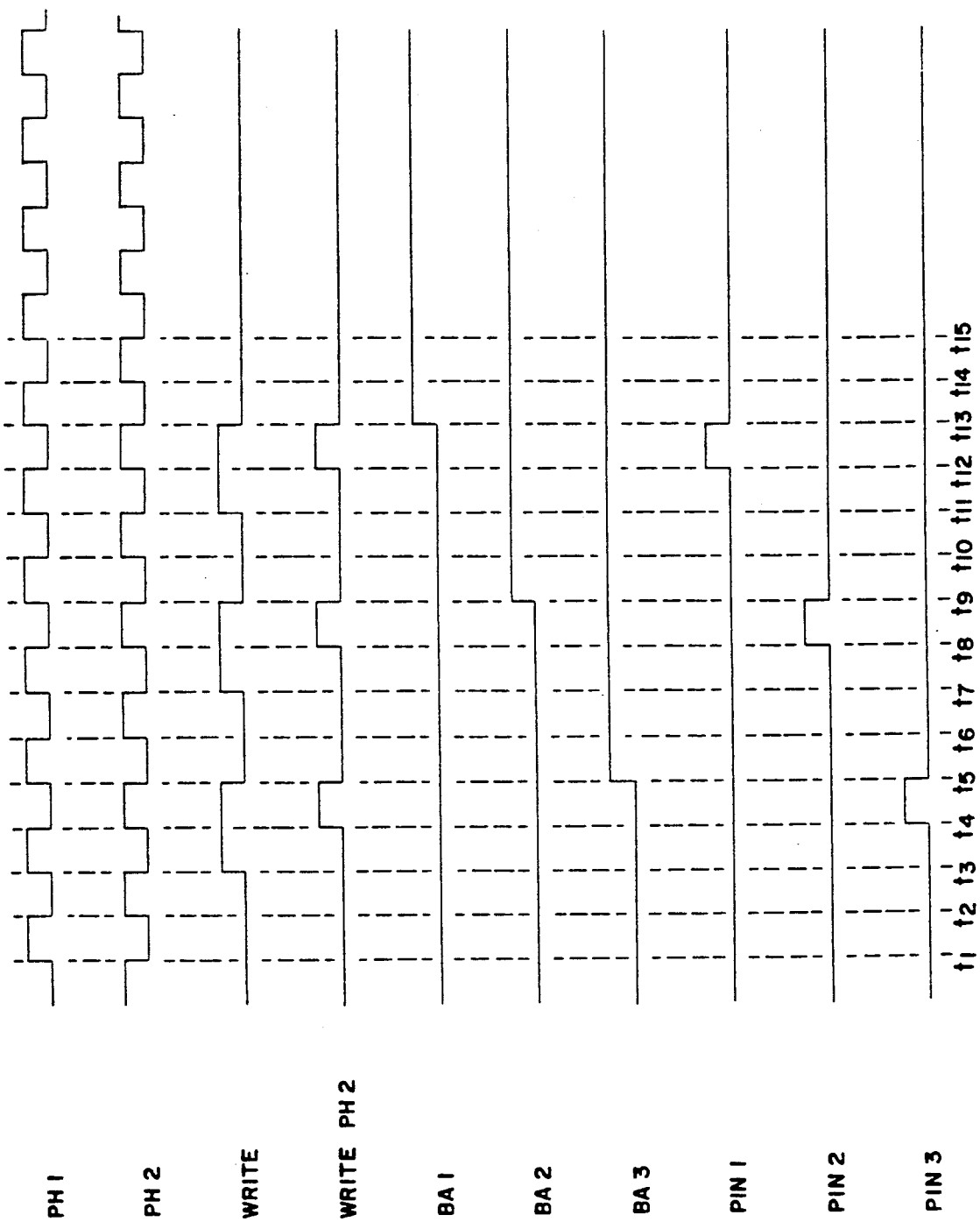
FIG. 3 is a timing diagram illustrating various signals associated with writing information into the apparatus of the present invention.

FIG. 3 is a timing diagram indicating the various signals associated with operation of the preferred embodiment of the present invention illustrated in FIGS. 2A and 2B. In FIG. 3, clock signals PH1, PH2 are synchronous clock signals having opposite phases. A WRITE signal is initiated whenever it is desired to write information packets to the byte cells of the apparatus 10. The WRITE signal is synchronized with clock signal PHI and clock signal PH2 in that the WRITE signal is always initiated when clock signal PHI goes positive (e.g., at times $t_3$, $t_7$, $t_{11}$) and WRITE signal goes to zero when clock signal PH2 goes to zero (e.g., at times $t_5$, $t_9$, $t_{13}$). Consequently, the WRITE PH2 signal is in phase with clock signal PH2, as indicated by the electrical schematic diagram of FIGS. 2A and 2B as well as the timing diagram of FIG. 3.

Signals BA1, BA2, BA3 respectively represent the outputs of status modules 54, 58, 62 in FIGS. 2A and 2B. Thus, as clearly illustrated in FIG. 3, the storage cells of the present invention fill from the bottom of the "stack" in that line BA3 goes positive before line BA2 goes positive which in turn occurs before line BA1 goes positive. Of course, as further illustrated in FIG. 3, parallel input signals are enabled by their respective tracking cells in order from the "bottom of the stack" so that parallel input signal PIN3 is enabled prior to enablement of parallel input signal PIN2 which, in turn, is enabled prior to parallel input signal PIN1. Thus, parallel input signal PIN3 affects the signal present on line BA3, parallel input signal PIN2 affects the signal present on line BA2, and parallel input signal PIN1 affects the signal level on line BA1.

Figure 4:
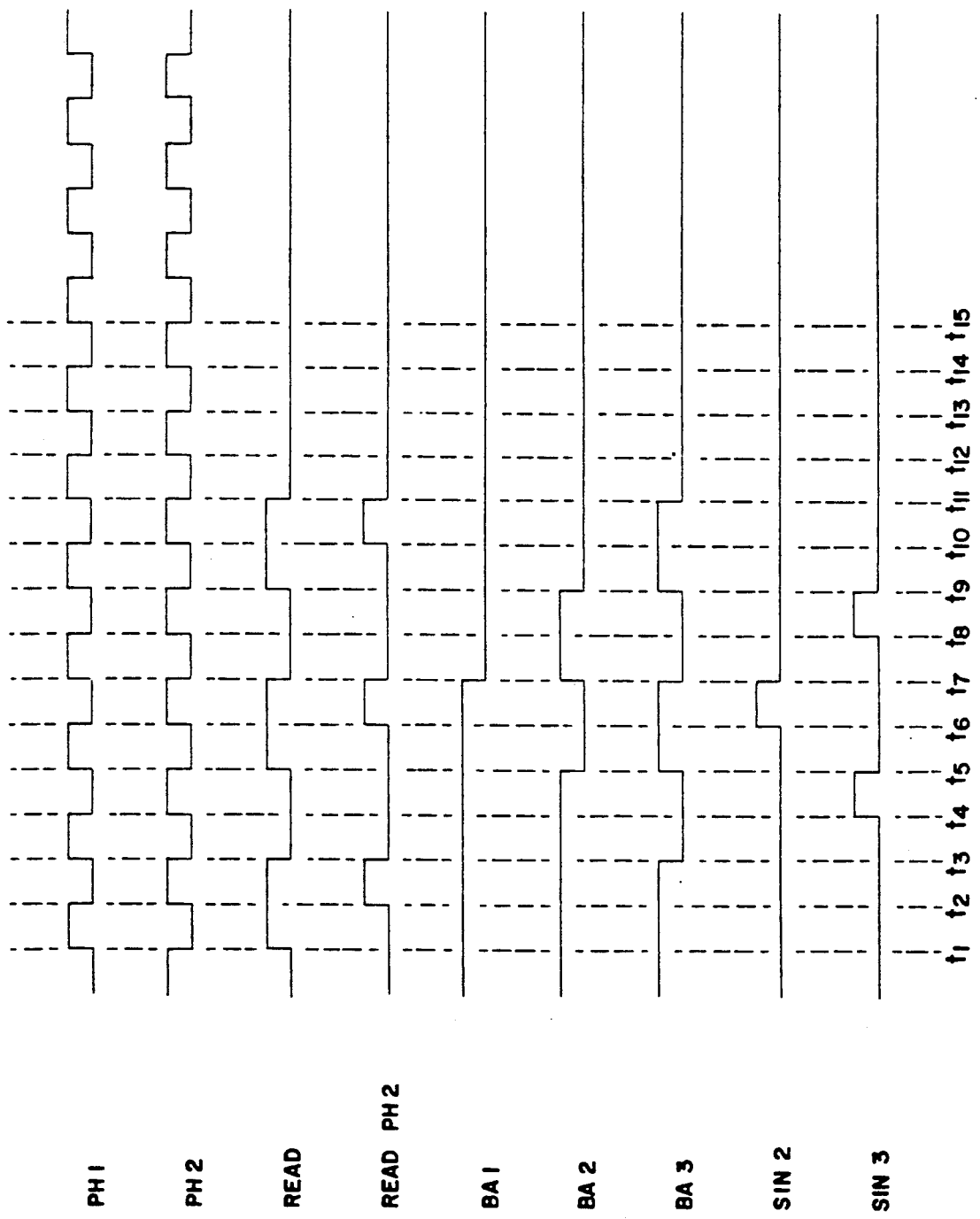
FIG. 4 is a timing diagram illustrating signals associated with propagating information through the apparatus of the present invention.

A timing diagram of the various signals associated with propagation of information through the various storage cells of the apparatus 10 is illustrated in FIG. 4. The propagation of information through apparatus 10 is dependent upon the same clock signals PH1, PH2. A READ signal, which is initiated coincident with a positive-going PH1 (e.g., at times $t_1$, $t_5$, $t_9$) and has a duration spanning PH1 and PH2, is applied to a NAND gate 166 (FIG. 2B) which NAND gate 166 has as a second input clocking signal PH2. Thus, NAND gate 166 produces an output which, when inverted by inverter 168, is the READ PH2 signal illustrated in FIG. 4. The READ PH2 signal is applied to gate 170 in status module 70 and thereby zeroes the input node 172 of inverter pair 174. The next subsequent positive going clock signal PH1 gates transfer gate 176, thereby bringing line BA4 to zero and, because of inverter 178, applying a logic "1" input to NAND gate 180 in logic module 68. Thus, at such time, NAND gate 180 receives appropriate inputs to effect gating of gate 182 so that the next subsequent clocking signal PH2 passes through gate 182 to effect transfer of information stored in storage cell 16 in a manner previously described in connection with the operation of storage cell 14.

By such use of two clocking signals PH1, PH2, the status module of a respective storage cell is assured to be cleared prior to the propagation of data from a next-higher cell in the "stack" to that respective storage cell.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

I claim:

1. An information storage apparatus for storage of information packets, the apparatus sequentially presenting said information packets at an output on a first-in-first-out bases and comprising:

an array of storage cell means for storing said information packets;

an input means for inputting said information packets; and a control means for controlling movement of said information packets within the apparatus;

each respective storage cell means of said array of storage cell means including at lest one byte cell, said array of storage cell means having a plurality of the first storage cell means and a plurality of second storage cell means, one of said plurality of first storage cell means and said plurality of second storage cell means being operatively connected as odd-numbered storage cell means from said output, the other of said plurality of first storage cell means and said plurality of second storage cell means being operatively connected as even-numbered storage cell means from said output;

said control means including a plurality of status means for registering a status for each storage cell means of said array of storage cell means, said control means further including a plurality of logic means for monitoring the status of each adjacent storage cell means of said array of storage cell means;

said input means inputting said information packets to said plurality of second storage cell means and inputting an inverse representation of said information packets to said plurality of first storage cell means.

2. An information storage apparatus for storage of information packets as recited in claim 1 wherein said array of storage cell means in configured for passing said information packets among said plurality of storage cell means in a predetermined sequence in response to a first signal, and wherein said array of storage cell means is configured for receiving said information packets by said input means in response to a second signal.

3. An information storage apparatus for storage of information packets as recited in claim 1 wherein said control means comprises a dedicated status means of said plurality of status means for each respective storage cell means of said array of storage cell means, and wherein said control means comprises a dedicated logic means of said plurality of logic means for each respective storage cell means of said array of storage cell means.

4. An information storage apparatus for storage of information packets as recited in claim 3 wherein said control means enables the passing of said information packets only to an empty storage cell means of said array of storage cell means from an adjacent information-containing storage cell means of said array of storage cell means.

5. An information storage apparatus for storage of information packets as recited in claim 4 wherein said control means enables the receiving of said information packets by the empty storage cell means most proximate said output.

6. An information storage apparatus for storage of information packets, the apparatus sequentially presenting said information packets at an output on a first-in-first-out basis and comprising:

an array of storage cell means for storing said information packets;
an input means for inputting said information packets; and
a control means for controlling movement of said information packets within the apparatus;
each respective storage cell means of said array of storage cell means including at least one paired inverter storage cell, said array of storage cell means having a plurality of first storage cell means and a plurality of second storage cell means, one of said plurality of first storage cell means and said plurality of second storage cell means being operatively connected as odd-numbered storage cell means from said output, the other of said plurality of first storage cell means and said plurality of second storage cell means being operatively connected as even-numbered storage cell means from said output;

said control means including a plurality of status means for registering a status for each storage cell means of said array of storage cell means, said control means further including a plurality of logic means for monitoring the status of each adjacent storage cell means of said array of storage cell means;

said input means inputting said information packets to said plurality of second storage cell means and inputting an inverse representation of said information packets to said plurality of first storage cell means.

7. An information storage apparatus for storage of information packets as recited in claim 6 wherein said array of storage cell means is configured for passing said information packets among said plurality of storage cell means in a predetermined sequence in response to a first signal, and wherein said array of storage cell means is configured for receiving said information packets by said input means in response to a second signal.

8. An information storage apparatus for storage of information packets as recited in claim 6 wherein said control means comprises a dedicated status means of said plurality of status means for each respective storage cell means of said array of storage cell means, and wherein said control means comprises a dedicated logic means of said plurality of logic means for each respective storage cell means of said array of storage cell means.

9. An information storage apparatus for storage of information packets as recited in claim 8 wherein said control means enables the passing of said information packets only to an empty storage cell means of said array of storage cell means from an adjacent information-containing storage cell means of said array of storage cell means.

10. An information storage apparatus for storage of information packets as recited in claim 9 wherein said control means enables the receiving of said information packets by the empty storage cell means most proximate said output.

* * * * *